US009111007B2

(12) United States Patent
Carounanidy et al.

(10) Patent No.: US 9,111,007 B2
(45) Date of Patent: Aug. 18, 2015

(54) ADAPTIVE RENDERING OF A WEBPAGE ON AN ELECTRONIC DISPLAY DEVICE

(75) Inventors: Kumar Carounanidy, Bangalore (IN); Kavitha Sambandam, Pondicherry (IN)

(73) Assignee: Jataayu Software Limited, Banglore, Karnataka (IN)

( * ) Notice: Subject to any disclaimer, the term of this patent is extended or adjusted under 35 U.S.C. 154(b) by 511 days.

(21) Appl. No.: 12/406,113

(22) Filed: Mar. 18, 2009

(65) Prior Publication Data
US 2010/0199195 A1    Aug. 5, 2010

(30) Foreign Application Priority Data

Feb. 4, 2009    (IN) .............................. 246/CHE/2009

(51) Int. Cl.
G06F 3/048 (2013.01)
G06F 17/30 (2006.01)
G06F 9/44 (2006.01)

(52) U.S. Cl.
CPC ........ *G06F 17/30905* (2013.01); *G06F 9/4443* (2013.01)

(58) Field of Classification Search
USPC .......................................... 715/760, 744–47
See application file for complete search history.

(56) References Cited

U.S. PATENT DOCUMENTS

| 6,014,638 | A * | 1/2000 | Burge et al. ................... 705/7.29 |
| 6,955,298 | B2 | 10/2005 | Herle |
| 7,234,107 | B1 * | 6/2007 | Aoki et al. ..................... 715/207 |
| 2002/0138331 | A1 * | 9/2002 | Hosea et al. ..................... 705/10 |
| 2003/0137522 | A1 * | 7/2003 | Kaasila et al. ................. 345/619 |
| 2005/0216846 | A1 | 9/2005 | Kalenius |
| 2006/0048051 | A1 * | 3/2006 | Lazaridis ...................... 715/517 |
| 2007/0074111 | A1 * | 3/2007 | Firshein et al. ............... 715/530 |
| 2009/0282343 | A1 * | 11/2009 | Catlin et al. .................. 715/738 |
| 2009/0327915 | A1 * | 12/2009 | Holdaway et al. ............ 715/745 |

FOREIGN PATENT DOCUMENTS

| CN | EP 1 853 019 A1 | 11/2007 |
| EP | 1953629 A1 * | 8/2008 |
| WO | WO 2005038673 A1 * | 4/2005 |

OTHER PUBLICATIONS

Hjerde, Morten, The anatomy of a text input field, Jun. 24, 2008, Sender 11, http://sender11.typepad.com/sender11/2008/06/the-anatomy-o-1.html.*

* cited by examiner

*Primary Examiner* — Matt Kim
*Assistant Examiner* — William Trapanese
(74) *Attorney, Agent, or Firm* — Ash Tankha; Lipton, Weinberger & Husick

(57) ABSTRACT

Disclosed herein is a method and system for rendering a web page on an electronic display device in a visual presentation format based on preferences of a user. An embedded browser application is provided on the electronic display device. The embedded browser application identifies alterable display attributes of elements on the web page and presents display options corresponding to the identified display attributes to the user. The user selects the presented display options based on preferences of the user. The embedded browser application modifies the identified display attributes of the web page elements by applying adaptive rendering rules on the identified display attributes. The embedded browser application creates the visual presentation format by incorporating the modified display attributes of the web page elements. The embedded browser application renders the web page adaptively on the electronic display device in the created visual presentation format.

19 Claims, 25 Drawing Sheets

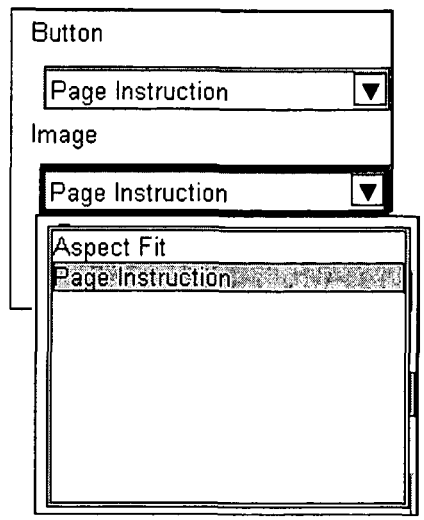
FIG. 3
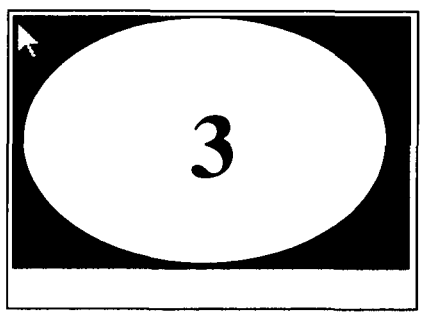
FIG. 4A  FIG. 4B

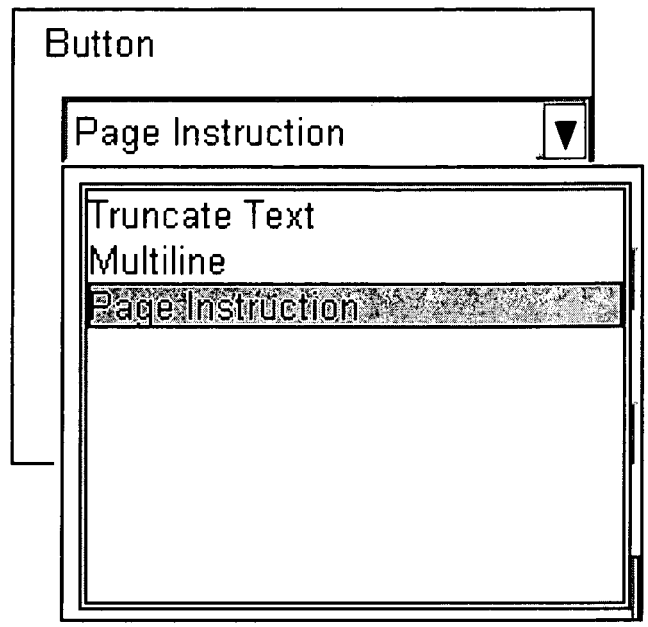
FIG. 5
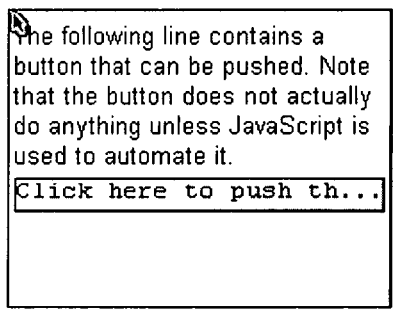 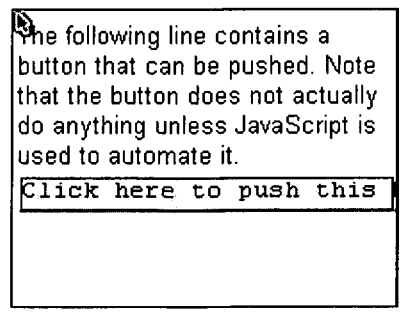
FIG. 6A            FIG. 6B

| Aus | 359-2 (50) | | R | (B) | 4's | 6's |
|---|---|---|---|---|---|---|
| A Gilchrist | c Sehwag b H Singh | | 57 | 48 | 8 | 1 |
| M Hayden | c Dravid H Singh | | 37 | 54 | 5 | 0 |
| R Ponting | not out | | 140 | 121 | 4 | 8 |
| D Martyn | not out | | 88 | 84 | 7 | 1 |
| D Lehmann | | | | | | |
| A Symonds | | | | | | |
| M Bevan | | | | | | |
| B Hogg | | | | | | |

FIG. 8B

| Aus | 359-2 (50) |
|---|---|
| A Gilchrist | c Sehwag b H S |
| M Hayden | c Dravid H Sin |
| R Ponting | not out |
| D Martyn | not out |
| D Lehmann | |
| A Symonds | |
| M Bevan | |
| B Hogg | |
| A Bichel | |

FIG. 8C

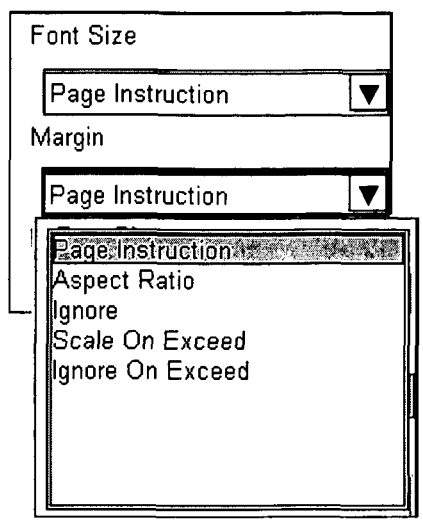
FIG. 14
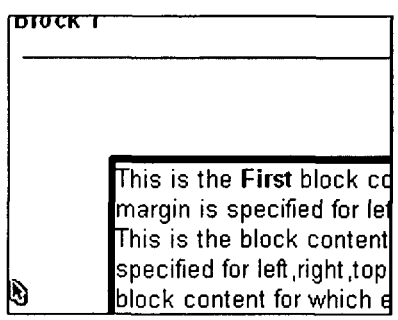
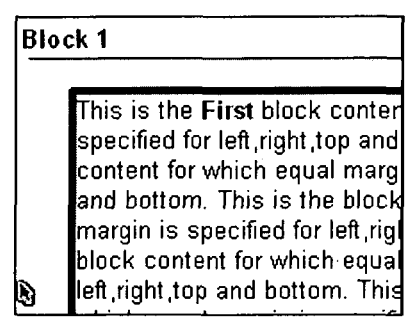
FIG. 15A
FIG. 15B

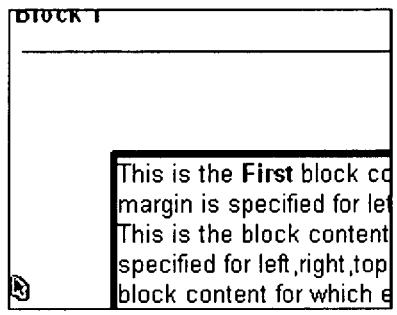
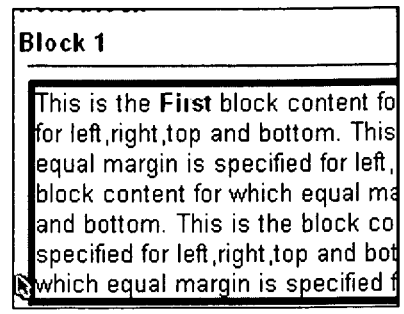
FIG. 15C
FIG. 15D
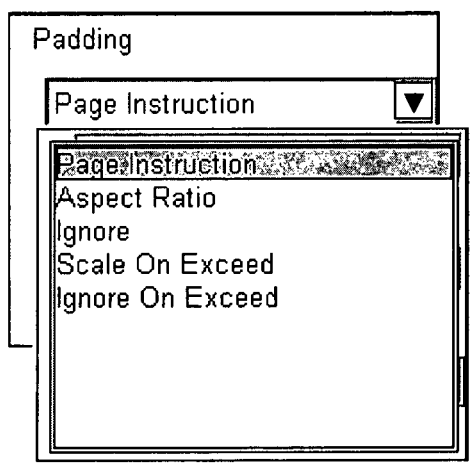
FIG. 16

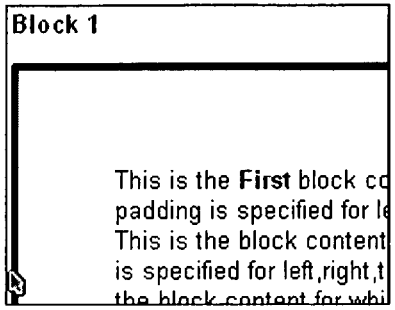
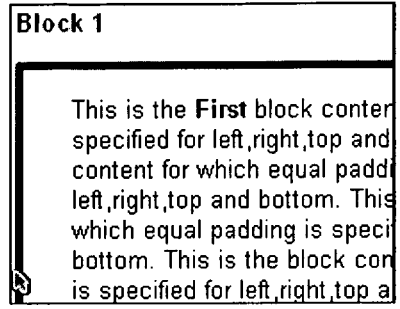
FIG. 17A					FIG. 17B
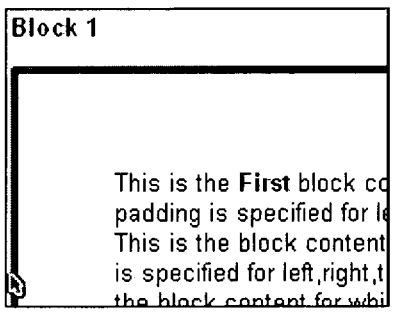
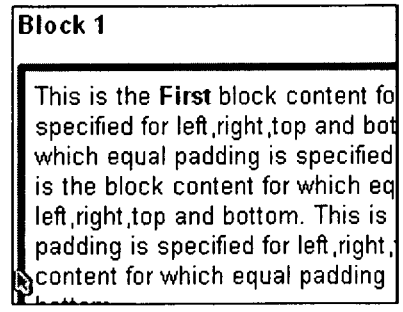
FIG. 17C					FIG. 17D

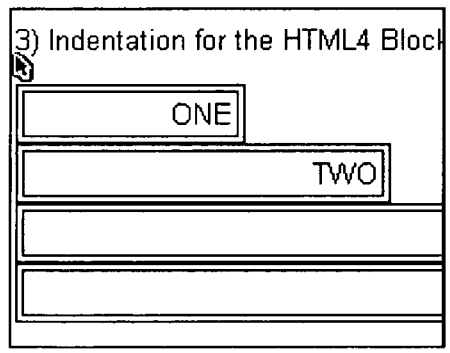
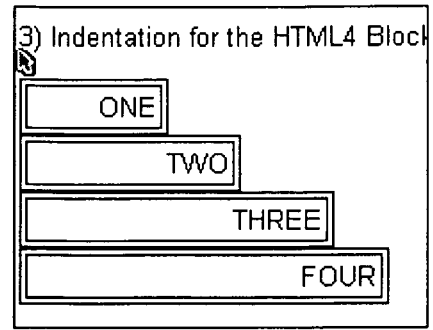
FIG. 22A  FIG. 22B
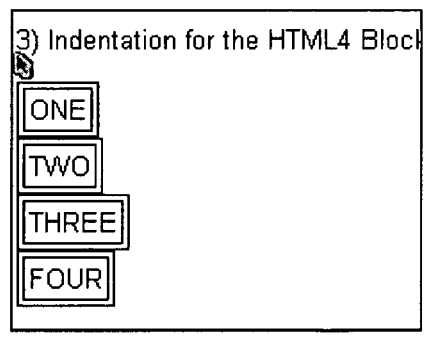
FIG. 22C

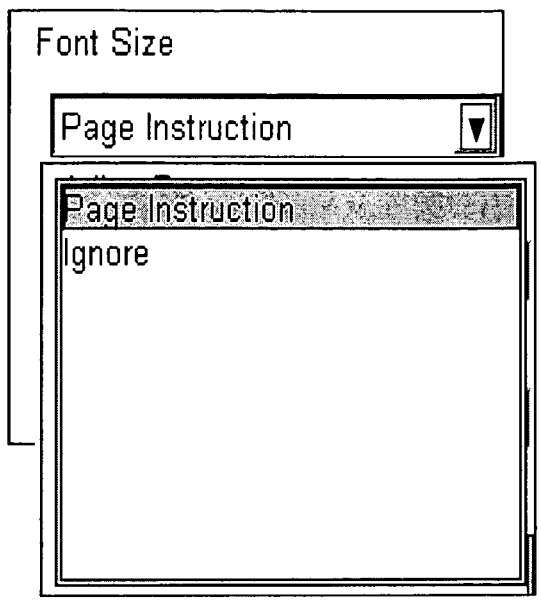
FIG. 23
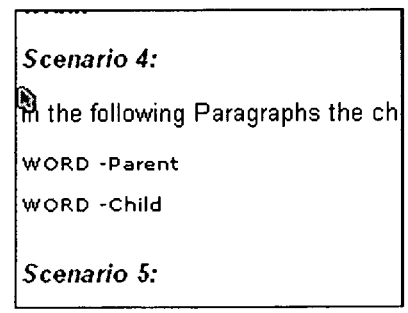
FIG. 24A                              FIG. 24B

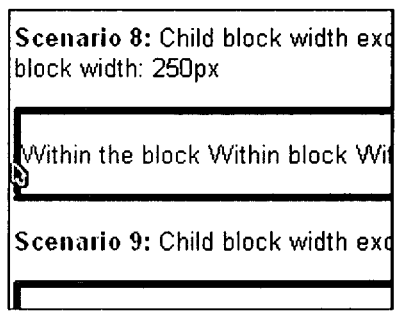 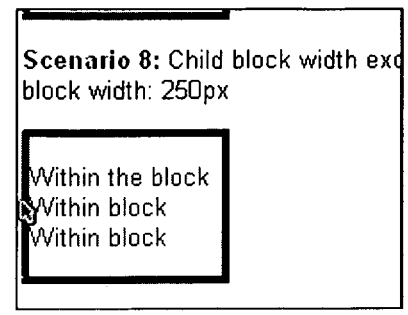
FIG. 26A    FIG. 26B
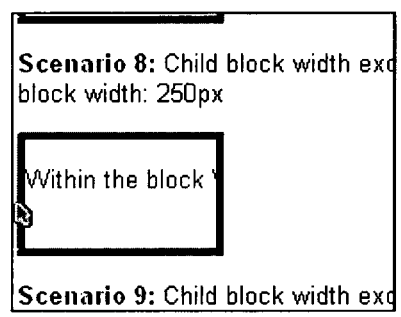
FIG. 26C

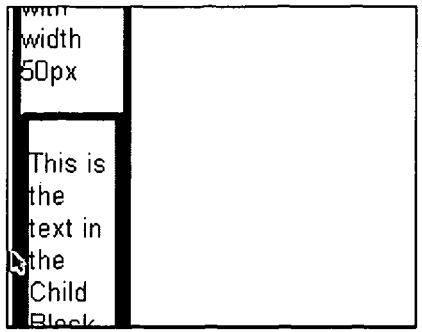
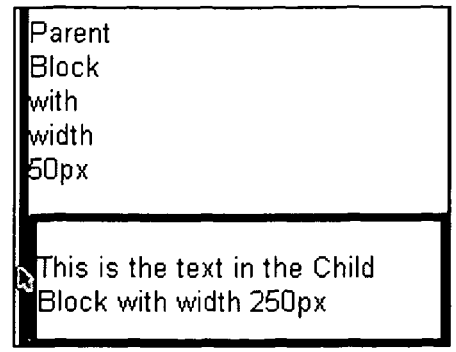
FIG. 28A　　　　　　　　　　　　　　FIG. 28B
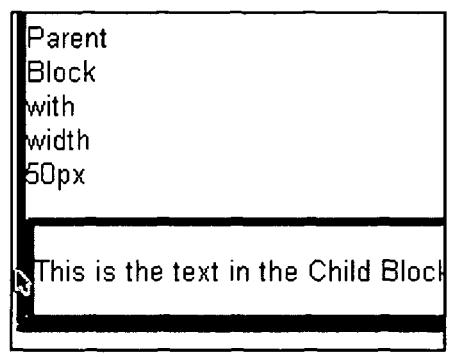
FIG. 28C

ADAPTIVE RENDERING OF A WEBPAGE ON AN ELECTRONIC DISPLAY DEVICE

CROSS REFERENCE TO RELATED APPLICATIONS

This application claims the benefit of non-provisional patent application number 246/CHE/2009 titled "Adaptive Rendering Of A Webpage On An Electronic Display Device", filed on Feb. 4, 2009 in the Indian Patent Office.

BACKGROUND

This invention, in general, relates to rendering of a web page on an electronic display device based on preferences of a user.

In today's digitally interconnected world, available technologies display web pages on a display device by applying systems or algorithms to the display device. However, due to the large number of geographies available and multiple web pages serving multitudes of end users across demographics and culture, the solutions prevalent today are far from satisfactory. Often, the user is not satisfied with the rendering of the web pages which results in limited usage of the web pages by the user. There is a need for active involvement of the user in rendering of the web pages in order to exercise the user's preferences. Moreover, there is a need for obtaining inputs from the user on different attributes and using these inputs for rendering the web pages for the satisfaction of the user.

Typically a web browser displays the web page comprising elements of the web page such as text, images, buttons, tables, videos, music, etc., in a markup language format on the web page. An embedded device may use an embedded web browser for displaying the web page. There may be a need to optimize an embedded web browser to display the web page to the user based on the user preferences. The embedded device may have restrictions on screen size, memory, and network bandwidth. The display of the web page on the embedded web browser may further require modification to conform to a given screen size of the embedded device without losing information contained in the web page. The embedded web browser may also need to support easy user navigation of the web page since the screen size is limited and to enable the user to navigate through a web page with minimal movement by the user.

Therefore, the presentation of the web page on the embedded device may require modification to conform to the screen size of the embedded device. If original display attributes of the elements of the web page are maintained, the user may find viewing the full image of the web page on the limited screen size of the embedded device to be problematic. The embedded web browser may also be required to render the web page in more than one visual presentation format which is adaptive to the screen size and the preferences of the user. Moreover, in order to improve user experience, there is a need for processing the web page and displaying the web page at the instant of receiving the web page from a server in order to reduce waiting time for the user.

Hence, there is a need for an embedded web browser that enables the user to modify the presentation of the web page on the embedded device in accordance with the user preferences. There is also a need for the embedded web browser to provide an interactive user interface that aids the user in iteratively modifying the visual presentation of the web page in accordance with the user preferences. The embedded web browser may also need to process the modifications made by the user in order to render the web page to the user based on the user preferences. Therefore, there is a need for adaptive rendering of the web page on the electronic display device in a visual presentation format based on user preferences.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the above stated needs for adaptive rendering of a web page on an electronic display device in a visual presentation format based on preferences of a user. A web page typically comprises elements, for example, text, images, buttons, tables, etc. An embedded browser application is provided on the electronic display device. The embedded browser application identifies alterable display attributes of the elements on the web page. The alterable display attributes control visual aspects of the web page elements. The embedded browser application presents display options corresponding to each of the identified display attributes to the user.

Furthermore, an expert may define multiple display attributes based on predetermined criteria. The predetermined criteria may, for example, be the geographical location of the user, user demographics, market trends, type of the electronic display device, technology used in the electronic display device, etc. In this case, the embedded browser application presents multiple display options to the user corresponding to each of the defined display attributes.

The user selects one or more of the presented display options based on the user's preferences. The embedded browser application then applies at least one of adaptive rendering rules on at least one of the identified display attributes based on the selection of the display options by the user. The embedded browser application modifies the identified display attributes of the web page elements based on the applied adaptive rendering rules. The embedded browser application creates a visual presentation format by incorporating the modified display attributes of the web page elements.

The embedded browser application renders the web page adaptively on the electronic display device in the created visual presentation format. The adaptively rendered web page comprises the web page elements with the modified display attributes. The rendering of the web page adaptively may be based on predefined capabilities of the electronic display device. The predefined capabilities of the electronic display device may, for example, comprise display size of the electronic display device and memory of the electronic display device. The embedded browser application may also store the user preferences comprising, for example, the presented display options selected by the user over a period of time, the visual presentation format of the adaptively rendered web page, and the modifications to the identified display attributes. The embedded browser application may also store user information comprising, for example, the geographical location of the user, user interaction patterns on the embedded browser application, and user demographics on the electronic display device. Based on the stored user preferences and the user information, the embedded browser application adaptively renders respective web pages on the electronic display device in the visual presentation format.

In order to modify the identified display attributes of the web page elements of the adaptively rendered web page, the user may further select the display options presented by the embedded browser application. The embedded browser application also captures the visual presentation format of the adaptively rendered web page for intelligently rendering multiple web pages on the electronic display device in the visual presentation format captured by the embedded browser application.

Moreover, the embedded browser application may capture the display options repeatedly selected by the user over a period of time for intelligently rendering the web page on the electronic display device in the visual presentation format, wherein the visual presentation format is created by modifying the identified display attributes of the web page elements based on the captured display options. The web page may also be adaptively rendered in dissimilar visual presentation formats based on the user preferences. The embedded browser application may incorporate the modified display attributes of the web page elements of the adaptively rendered web page in each of the dissimilar visual presentation formats based on the display options selected by the user.

Furthermore, the identification of the alterable display attributes and the presentation of the display options may be performed on a remote computing device. The embedded browser application creates the visual presentation format by modifying the alterable display attributes obtained from the remote computing device based on the selection of display options by the user, and renders the web page adaptively on the electronic display device.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIG. 3 exemplarily illustrates display options presented to a user for a visual image of a web page.

FIGS. 4A-4B exemplarily illustrate an adaptively rendered web page in dissimilar visual presentation formats based on display options selected by a user for the visual image of the web page.

FIG. 5 exemplarily illustrates display options presented to a user for a functional button of a web page.

FIGS. 6A-6B exemplarily illustrate an adaptively rendered web page in dissimilar visual presentation formats based on display options selected by a user for the functional button of the web page.

FIGS. 8A-8C exemplarily illustrate an adaptively rendered web page in dissimilar visual presentation formats based on modifications to the representative table on the web page.

FIG. 14 exemplarily illustrates display options presented to a user for a margin property of a cascading style sheet box model on a web page.

FIGS. 15A-15D illustrate an adaptively rendered web page in dissimilar visual presentation formats based on modifications to the margin property of the cascading style sheet box model on the web page.

FIG. 16 exemplarily illustrates display options presented to a user for a padding property of a cascading style sheet box model on a web page.

FIGS. 17A-17D illustrate an adaptively rendered web page in dissimilar visual presentation formats based on modifications to the padding property of the cascading style sheet box model on the web page.

FIGS. 22A-22C exemplarily illustrate an adaptively rendered web page in dissimilar visual presentation formats based on modifications to the text indentation property in the cascading style sheet box model of the web page.

FIG. 23 exemplarily illustrates display options presented to a user for a font size property of text in a cascading style sheet box model of a web page.

FIGS. 24A-24B exemplarily illustrate an adaptively rendered web page in dissimilar visual presentation formats based on modifications to the font size property in the cascading style sheet box model of the web page.

FIGS. 26A-26C exemplarily illustrate an adaptively rendered web page in dissimilar visual presentation formats based on modifications to the text wrap in the cascading style sheet box model of the web page.

FIGS. 28A-28C exemplarily illustrate an adaptively rendered web page in dissimilar visual presentation formats based on modifications to display positions of the child web page elements relative to the parent web page element of the web page.

DETAILED DESCRIPTION OF THE INVENTION

Figure 1:
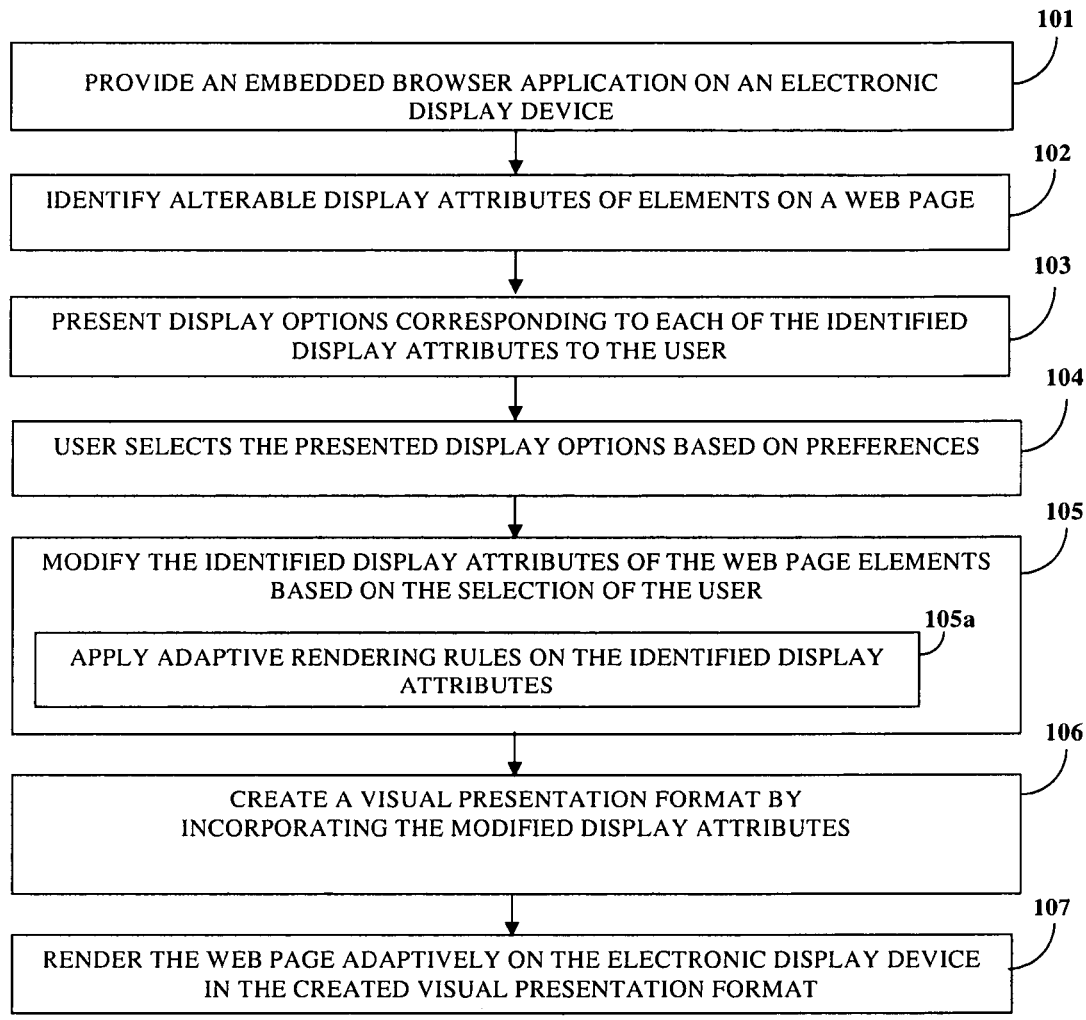
FIG. 1 illustrates a method of adaptive rendering of a web page on an electronic display device in a visual presentation format based on preferences of a user.
Figure 2:
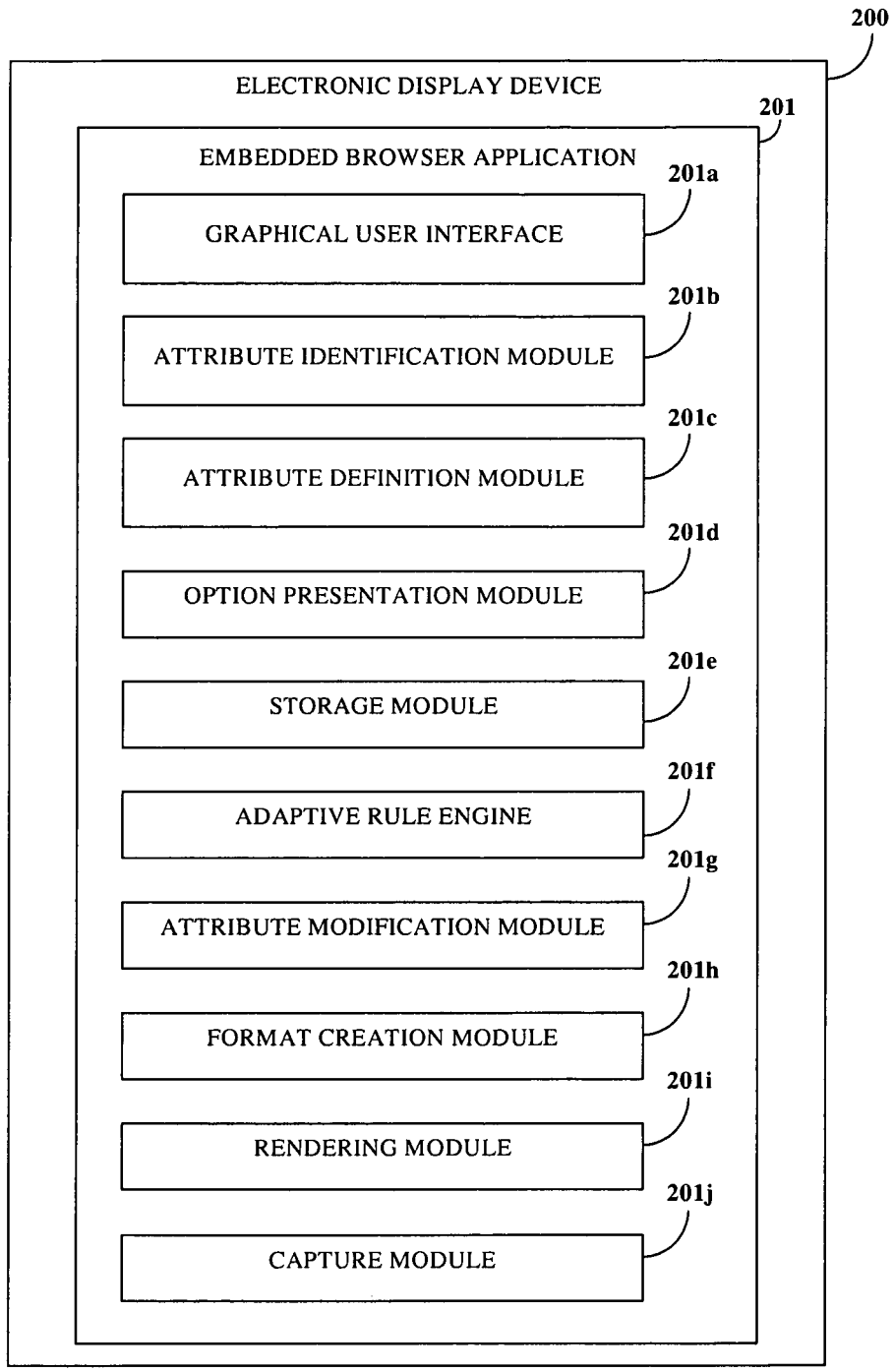
FIG. 2 illustrates a system for adaptive rendering of a web page on an electronic display device in a visual presentation format based on preferences of a user.

FIG. 1 illustrates a method of rendering of a web page on an electronic display device 200 in a visual presentation format based on preferences of a user. An embedded browser application 201 is provided 101 on the electronic display device 200. A web page comprises elements, for example, text, images, buttons, tables, etc. The components of the embedded browser application 201 are illustrated in FIG. 2. The embedded browser application 201 identifies 102 alterable display attributes of the elements on the web page. The alterable display attributes control visual aspects of the web page elements. The embedded browser application 201 presents 103 display options corresponding to each of the identified display attributes to the user.

An expert may also define multiple display attributes based on predetermined criteria. The display attributes control the look, feel, and aesthetics of the web page. The predetermined criteria are, for example, the geographical location of the user, user demographics, market trends, type of the electronic display device 200, and technology used in the electronic display device 200. In this case, the embedded browser application 201 presents multiple display options to the user corresponding to each of the defined display attributes. For example, a handset manufacturer of the electronic display device 200 may preset display settings on the electronic display device 200 to present the display options to the user based on the defined display attributes. The display options may, for example, comprise preset display templates, visual effects, display skins, picture frames, visual themes, etc.

The embedded browser application 201 enables the user to select the presented display options on the electronic display device 200. The user then selects 104 one or more of the presented display options based on user preferences. The embedded browser application 201 modifies 105 the identified display attributes of the web page elements based on the selection of the user. The embedded browser application 201 first applies 105a at least one of the adaptive rendering rules on at least one of the identified display attributes based on the selection of the user. The embedded browser application 201 then modifies the identified display attributes of the web page elements based on the applied adaptive rendering rules. The embedded browser application 201 creates 106 a visual presentation format by incorporating the modified display attributes of the web page elements.

The embedded browser application 201 then renders 107 the web page adaptively on the electronic display device 200 in the created visual presentation format. The adaptively rendered web page comprises the web page elements with the modified display attributes. The rendering of the web page adaptively may be based on predefined capabilities of the electronic display device 200. The predefined capabilities of the electronic display device 200 may comprise display size of the electronic display device 200 and memory of the electronic display device 200.

The embedded browser application 201 may also store the user preferences. The stored preferences of the user may, for example, comprise the presented display options selected by the user over a period of time, the visual presentation format of the adaptively rendered web page, and the modifications made to the identified display attributes. The embedded browser application 201 may also store user information on the electronic display device 200. The user information may, for example, be the geographical location of the user, user interaction patterns on the embedded browser application 201, and user demographics. The embedded browser application 201 adaptively renders successive web pages on the electronic display device 200 in the visual presentation format based on the stored user preferences and the user information.

In order to modify the identified display attributes of the web page elements of the adaptively rendered web page, the user may further select the display options presented by the embedded browser application 201 on the electronic display device 200. The web page may also be adaptively rendered in dissimilar visual presentation formats based on the user preferences. The embedded browser application 201 may incorporate the modified display attributes of the web page elements of the adaptively rendered web page in each of the dissimilar visual presentation formats based on the display options selected by the user. For example, the user may define the visual presentation format for the web page by selecting one of the display options corresponding to each of the identified display attributes. The embedded browser application 201 may then apply adaptive rendering rules to the alterable display attributes based on the selected display options to adaptively render the web page in the visual presentation format as defined by the user.

The user may also have control over the adaptively rendered web page. The user may modify the selected display options corresponding to each of the identified display attributes to modify the web page in a dissimilar visual presentation format. The embedded browser application 201 may capture the visual presentation format of the adaptively rendered web page for intelligently rendering multiple web pages on the electronic display device 200 in the visual presentation format captured by the embedded browser application 201. The embedded browser application 201 may also capture the display options repeatedly selected by the user over a period of time. The embedded browser application 201 may then create the visual presentation format by modifying the identified display attributes of the web page elements based on the captured display options. The embedded browser application 201 may then intelligently render the web page on the electronic display device 200 in the visual presentation format.

The steps of identifying the alterable display attributes of the web page elements and presenting the display options may also be performed on a remote computing device. The remote computing device comprises, for example, a service provider system, a technical user system, a general personal computer, etc. The user selects one or more of the presented display options on the remote computing device. The remote computing device may transmit the alterable display attributes and the selection of the display options of the user to the electronic display device 200 using one or more multiple data transmission channels and multiple data communication networks. The embedded browser application 201 may then modify the alterable display attribute based on the user selection obtained from the remote computing device. The embedded browser application 201 may then create the visual presentation format using the modified display attributes. The embedded browser application 201 may then render the web page adaptively on the electronic display device 200 in the visual presentation format.

Consider an example where one of the web page elements is a visual image on the web page. The visual image may be used for pictorial representation of multimedia content on the web page. The alterable display attributes of the visual image may, for example, be dimensions of the visual image displayed on the web page. The dimensions of the visual image on the web page may not conform to the display size of the electronic display device 200. The user may need to modify the dimensions of the visual image. Therefore, to enable the user to create a visual presentation format of the web page with modified dimensions of the visual image, the embedded browser application 201 presents the user with display options to modify the dimensions of the visual image on the electronic display device 200. The display options control visual aspects of the visual image on the electronic display device 200. The display options presented to the user for modifying the dimensions of the visual image may, for example, comprise an "Aspect Fit" display option and a "Page instruction" display option as exemplarily illustrated in FIG. 3. The embedded browser application 201 applies adaptive rendering rules on the dimensions of the visual image based on the display options selected by the user to modify the dimensions of the visual image.

If the width of the visual image exceeds the display size of the electronic display device 200 and the user selects the "Aspect Fit" display option, the embedded browser application 201 applies an adaptive rendering rule for resizing the visual image to conform to the display size of the electronic display device 200. The embedded browser application 201 may modify the dimensions of the visual image, for example, the width and height of the visual image, based on the applied adaptive rendering rule to conform to the display size of the electronic display device 200. The embedded browser application 201 creates the visual presentation format by incorporating the modified width and the height of the visual image. The embedded browser application 201 then adaptively renders the web page in the created visual presentation format with the visual image in the modified width and the height on the electronic display device 200 as exemplarily illustrated in FIG. 4A.

If the user selects the "Page Instruction" display option, the embedded browser application 201 applies an adaptive rendering rule for retaining dimensions of the visual image as specified in the web page script of the web page to display the visual image with the retained dimensions on the electronic display device 200. The user selects the "Page Instruction" display option for viewing the web page on a desktop of an electronic display device 200 such as a computer through the embedded browser application 201. The embedded browser application 201 does not modify the dimensions of the visual image based on the applied adaptive rendering rule for the selected "Page Instruction" display option. The embedded browser application 201 retains the dimensions of the visual image specified in web page script of the web page for display of the visual image on the electronic display device 200 based on the applied adaptive rendering rule for the "Page Instruction" display option. The web page script of the web page contains information on the visual aspects of the web page elements present in the web page. The embedded browser application 201 then adaptively renders the web page on the electronic display device 200 without modifying the dimensions of the visual image on the web page as exemplarily illustrated in FIG. 4B. If the dimensions of the visual image exceed the display size of the electronic display device 200, the user may have to scroll to view the adaptively rendered visual image in entirety.

Consider an example where the web page elements are functional buttons on the web page. The user may submit forms, reset control values, etc. on the electronic display device 200 through the embedded browser application 201 by using the functional buttons. The alterable display attributes of the functional buttons may, for example, be sizes of the functional buttons displayed on the web page. The functional buttons may be of different sizes depending on the sizes specified in the web page script of the web page Text may also be displayed on functional buttons of different sizes. In order to control the sizes of the functional buttons displayed on the electronic display device 200, the embedded browser application 201 presents the user with display options on the electronic display device 200. The display options presented for modifying the sizes of the functional buttons may, for example, comprise a "Truncate Text" display option, a "Multiline" display option, a "Marquee" display option, and a "Page Instruction" display option.

If the width of the functional buttons exceeds the display size of the electronic display device 200 and the user selects the "Truncate Text" display option illustrated in FIG. 5, the embedded browser application 201 applies an adaptive rendering rule for resizing the width of the functional buttons to fit the display size of the electronic display device 200. The embedded browser application 201 also applies the adaptive rendering rule for truncating text to be displayed on the functional buttons if the text displayed on the functional buttons does not fit within the resized width of the functional buttons as illustrated in FIG. 6A. The embedded browser application 201 modifies the width of the functional buttons and truncates the text displayed on the functional buttons in accordance with the modified width of the functional buttons based on the applied adaptive rendering rule for the "Truncate Text" display option. The embedded browser application 201 creates a visual presentation format by incorporating the modified width of the functional buttons and the truncated text to be displayed on the functional buttons in the visual presentation format. The embedded browser application 201 then adaptively renders the web page in the created visual presentation format on the electronic display device 200 with the functional buttons in the modified width and the truncated text displayed on the functional buttons.

If the width of the functional buttons exceeds the display size of the electronic display device 200 and the user selects the "Multiline" display option illustrated in FIG. 5, the embedded browser application 201 applies an adaptive rendering rule for resizing the width of the functional buttons to fit the display size of the electronic display device 200. The embedded browser application 201 applies the adaptive rendering rule for displaying the text on the functional buttons in multiple lines by modifying the height of the functional buttons if the text to be displayed on the functional buttons does not fit within the functional buttons with the modified width. The user selects the "Multiline" display option to view the text to be displayed on the functional buttons in multiple lines. The embedded browser application 201 first modifies the width of the functional buttons and then modifies the height of the functional buttons to accommodate the text to be displayed in multiple lines on the functional buttons based on the applied adaptive rendering rule for the "Multiline" display option. The embedded browser application 201 then creates the visual presentation format by incorporating the modified width, the text in multiple lines and the modified height of the functional buttons. The embedded browser application 201 then adaptively renders the web page in the created visual presentation format on the electronic display device 200 with the functional buttons in the modified width and the modified height, and containing the text in multiple lines.

If the width of the functional buttons exceeds the display size of the electronic display device 200 and the user selects the "Marquee" display option, the embedded browser application 201 applies an adaptive rendering rule for resizing the width of the functional buttons to fit the display size of the electronic display device 200. The embedded browser application 201 also applies the adaptive rendering rule for displaying partial text on the functional buttons if the text on the functional buttons does not fit within the modified width of the functional buttons in order to marquee the displayed partial text when the user focuses a cursor on the functional buttons on the electronic display device 200. The embedded browser application 201 modifies the width of the functional buttons based on the applied adaptive rendering rule for the "Marquee" display option.

The embedded browser application 201 may then allow partial display of the display text on the functional buttons if the text to be displayed does not fit into the functional buttons with the modified width. The embedded browser application 201 then creates the visual presentation format by incorporating the modified width of the functional buttons and the partial display of the text to be displayed on the functional buttons. The embedded browser application 201 then adaptively renders the web page in the created visual presentation format on the electronic display device 200 with the functional buttons in the modified width and containing the partial display of the text to be displayed on the functional buttons. The partial display of the text to be displayed on the functional buttons may marquee when the user focuses a cursor on the functional buttons on the electronic display device 200.

If the user selects the "Page Instruction" display option illustrated in FIG. 5 for the functional buttons, the embedded browser application 201 applies an adaptive rendering rule for retaining the sizes of the functional buttons as specified in the web page script of the web page. The embedded browser application 201 may not modify the sizes of the functional buttons based on the display size of the electronic display device 200 when the user selects the "Page Instruction" display option. The user can then view the display text of the button in a single line as exemplarily illustrated in FIG. 6B. The embedded browser application 201 then adaptively renders the web page based on the web page script of the web page. If the sizes of the functional buttons exceed the display size of the electronic display device 200, the user may have to scroll to view the functional buttons in entirety on the adaptively rendered web page.

Consider an example where one of the web page elements is a representative table on the web page. The representative table may allow the user to arrange data into rows and columns of cells of the representative table. The cells of the representative table may, for example, contain text, visual images, links, form fields, etc. The alterable display attributes of the representative table may, for example, be dimensions of the representative table displayed on the web page. The dimensions of the representative table is determined by content contained within the cells of the representative table, number of rows and columns of the cells in the representative table, and style information associated with the content contained within the cells of the representative table. In order to modify the dimensions of the representative table and enable clarity of display of the representative table on the electronic display device 200 to the user, the embedded browser application 201 presents the user with display options related to the dimensions of the representative table. The display options for modifying the dimensions of the representative table may, for example, be a "Row Order" display option, a "Column Order" option, a "Table fit" display option, and a "Page Instruction" display option.

Figure 7:
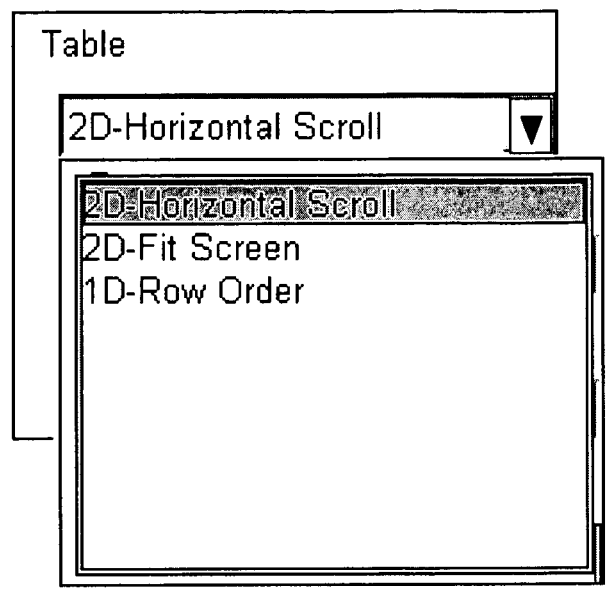
FIG. 7 exemplarily illustrates display options presented to a user for a representative table on a web page.
Figure 8A:
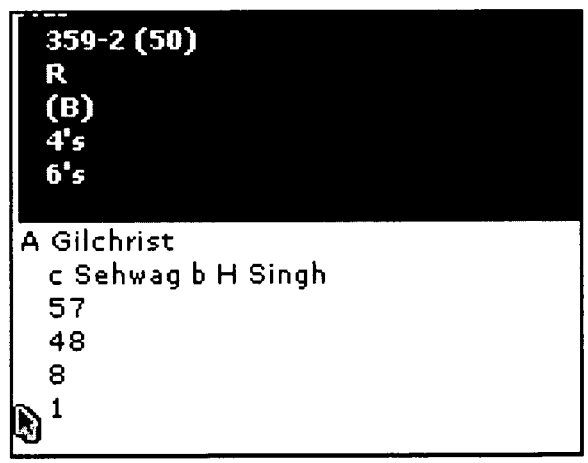

If the user selects the "Row Order" display option, the embedded browser application 201 applies an adaptive rendering rule for presenting the representative table based on order of rows in the representative table and ignores the tabular format of the representative table as exemplarily illustrated in FIG. 8A. The tabular format comprises cells arranged in the rows and the columns of the representative table. The "Row Order" display option may also be presented as a "1D Row Order" display option as illustrated in FIG. 7. The adaptive rendering rule for presentation of the representative table based on order of rows may assign the first column of every one of the rows in the representative table as the head cell and indent other columns with respect to the first column of the representative table. The embedded browser application 201 modifies arrangement of rows and columns of the cells based on the applied adaptive rendering rule for "Row Order" display option.

The embedded browser application 201 creates the visual presentation format by incorporating the modified arrangement of the rows and the columns of the cells of the representative table. The embedded browser application 201 then adaptively renders the web page in the created visual presentation format with the modified arrangement of the rows and the columns of the cells of the representative table. For example, if the representative table contains two rows and three columns, the embedded browser application 201 adaptively renders the representative table after application of the adaptive rendering rule for the "Row Order" display option in the visual presentation format on the electronic display device 200 as follows:

R1C1
   R1C2
   R1C3
R2C1
   R2C2
   R2C3 wherein R1, R2, and R3 represent the first row, the second row, and the third row of the representative table respectively and C1, C2, and C3 represent the first column, the second column, and the third column of the representative table respectively. If the user selects the "Column Order" display option, the embedded browser application 201 applies an adaptive rendering rule for the presentation of the representative table based on order of each of the columns in the representative table and ignores the tabular format of the representative table. The adaptive rendering rule for presentation of the representative table based on order of the columns assigns the first row of every column of the representative table as the head cell and indent rows of the representative table with respect to the first row of the representative table. For example, if the representative table contains two rows and three columns, the embedded browser application 201 adaptively renders the representative table after application of the defined adaptive rendering rule for the "Column Order" display option on the electronic display device 200 as follows:

R1C1
   R2C1
R1C2
   R2C2
R1C3
   R2C3 wherein R1, R2, and R3 represent the first row, the second row, and the third row of the representative table respectively and C1, C2, and C3 represent the first column, the second column, and the third column of the representative table respectively.

If the user selects the "Table Fit" display option, the embedded browser application 201 applies an adaptive rendering rule for presenting the representative table in the tabular format of the representative table if the representative table can be adapted within the display size of the electronic display device 200 as illustrated in FIG. 8B. The "Table Fit" display option may also be represented as a "2D Fit Screen" display option as illustrated in FIG. 7. The embedded browser application 201 also applies the adaptive rendering rule for ignoring the tabular format of the representative table in accordance with the "Row Order" display option. The embedded browser application 201 retains the tabular format of the representative table as specified in the web page script of the web page if the representative table can be displayed within the display size of the electronic display device 200 based on the applied adaptive rendering rule for the "Table Fit" display option. If the representative table cannot be displayed within the display size of the electronic display device 200, the embedded browser application 201 ignores the tabular format of the representative table and applies the adaptive rendering rule for the "Row Order" display option.

If the user selects the "Page Instruction" display option for the representative table, the embedded browser application 201 applies an adaptive rendering rule for retaining the tabular format of presentation of the representative table even if the presentation of the representative table exceeds the display size of the electronic display device 200 as illustrated in FIG. 8C. The "Page Instruction" display option may also be represented as a "2D Horizontal Scroll" display option as illustrated in FIG. 7. The embedded browser application 201 retains the dimensions of the representative table specified in web page script of the web page for display of the representative table on the electronic display device 200 based on the applied adaptive rendering rule for the "Page Instruction" display option. The embedded browser application 201 then adaptively renders the web page without modifying the dimensions of the representative table on the electronic display device 200. If the dimensions of the representative table exceed the display size on the electronic display device 200, the user may have to scroll to view the adaptively rendered representative table in entirety.

Figure 9:
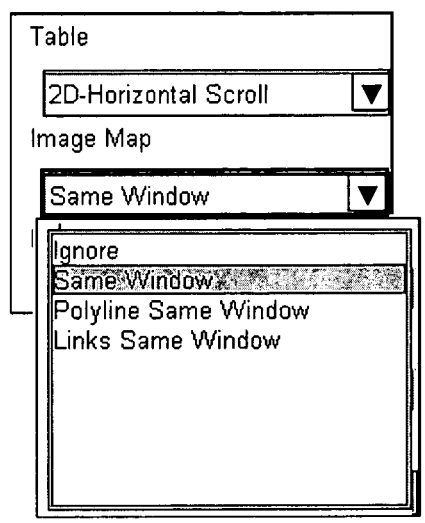
FIG. 9 exemplarily illustrates display options presented to a user for an image map on a web page.
Figure 10A:
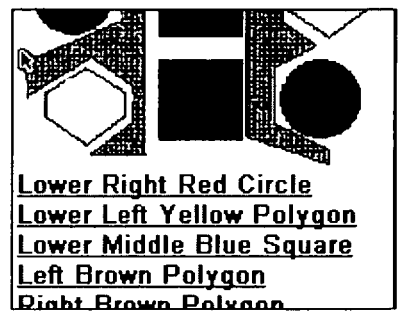
FIGS. 10A-10C exemplarily illustrate an adaptively rendered web page in dissimilar visual presentation formats based on modifications to the image map on the web page.

Consider an example where one of the web page elements is an image map on the web page. Specific regions of a visual image may be associated with specific actions which can be invoked by the user. The specific regions may be represented on the visual image as the image map. After application of one of the defined adaptive rendering rules for the visual image on the web page, the display of the visual image on the electronic display device 200 may be modified, however navigation on the visual image displayed on the electronic display device 200 may be problematic to the user. In order to provide ease of navigation to the user, the embedded browser application 201 presents the user with display options for creating an image map. The display options for creating the image map of the visual image may, for example, comprise a "Region as Links" display option, a "Region as Rectangle" display option, a "Page Instruction" display option, and an "Ignore" display option. If the user selects the "Region as Links" display option, the embedded browser application 201 applies an adaptive rendering rule to modify the visual image into the image map. The "Region as Links" display option may also be represented as a "Links Same Window" display option as illustrated in FIG. 9. The specific regions are displayed on the visual image as the image map by encoding the specific regions as hyper link text below the visual image on the electronic display device 200 as illustrated in FIG. 10A. The embedded browser application 201 may enable the user to invoke the specific actions on the visual image on activation of the hyper link text by the user on the electronic display device 200.

Figure 10B:
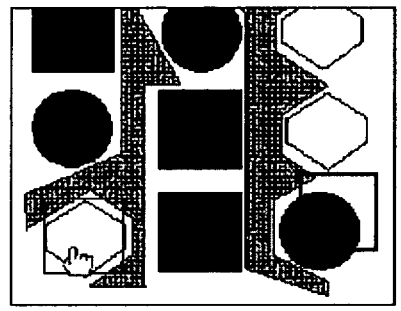
Figure 10C:
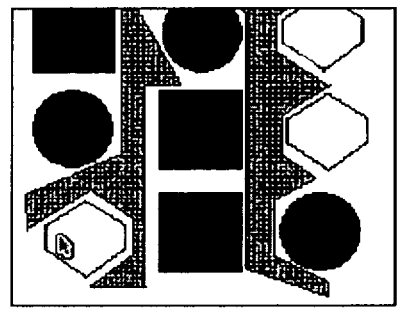

If the user selects the "Region as Rectangle" display option, the embedded browser application 201 applies an adaptive rendering rule to subdivide the visual image into visual rectangles to represent the visual image in entirety and constitute the image map. The "Region as Rectangle" display option may also be represented as a "Polyline Same Window" display option as illustrated in FIG. 9. The user may navigate the subdivided visual rectangles of the visual image on the image map. If the user selects the "Page Instruction" display option for the image map, the embedded browser application 201 applies an adaptive rendering rule to adaptively render the visual image on the electronic display device 200 without modifying the visual image into an image map as illustrated in FIG. 10B. The "Page Instruction" display option may also be represented as a "Same Window" display option as illustrated in FIG. 9. If the user selects the "Ignore" display option illustrated in FIG. 9, the embedded browser application 201 applies an adaptive rendering rule to adaptively render the visual image by ignoring the specific regions and the specific actions to be invoked by the user on the visual image as illustrated in FIG. 10C.

Consider an example where one of the web page elements is a frame of the web page. The frame may allow presentation of multiple documents in a single view to the user on the electronic display device 200. Presenting multiple documents in a single view may increase memory usage of the electronic display device 200 and may be problematic for the user to navigate the frame. Therefore, based on the selection of the display options for the frame by the user either an entire document or a specific document among the multiple documents may be replaced to display the multiple documents selectively. The frame may be specified in a tabular format. By controlling the presentation of the frame, user navigation experience and memory usage of the electronic display device 200 may be improved. The display options presented by the embedded browser application 201 for the frame may, for example, comprise a "Links" display option, a "As Block" display option, "Page Instruction" display option, and a "Ignore" display option.

Figure 11:
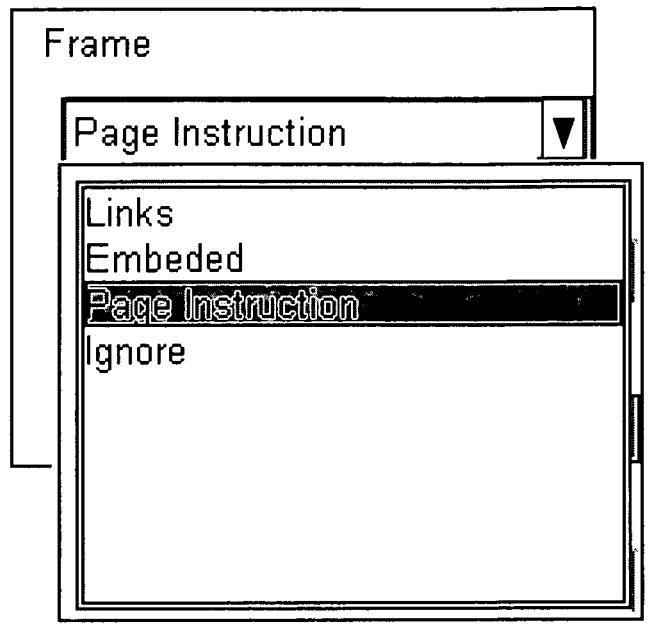
FIG. 11 exemplarily illustrates display options presented to a user for a frame on a web page.
Figure 12A:
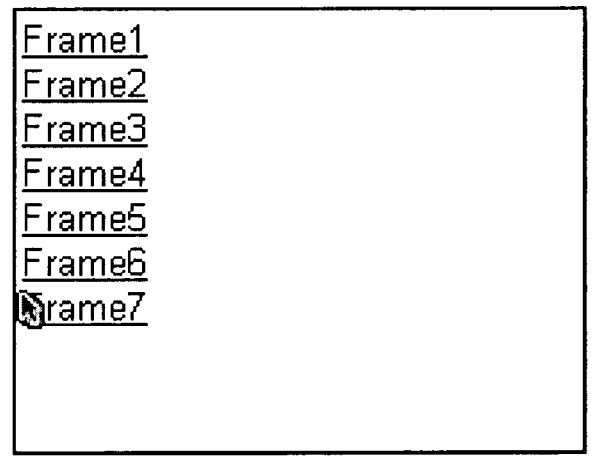
FIGS. 12A-12C exemplarily illustrate an adaptively rendered web page in dissimilar visual presentation formats based on modifications to the frame on the web page.

If the user selects the "Links" display option illustrated in FIG. 11, the embedded browser application 201 applies an adaptive rendering rule for displaying the frame as an anchor and ignores the tabular format of the frame. The embedded browser application 201 may encode the frames as hyperlinks based on the applied adaptive rendering rule for the "Links" display option. The embedded browser application 201 may then create the visual presentation format by incorporating the encoded frames. The embedded browser application 201 may then adaptively render the web page in the created visual presentation format with the multiple frames displayed as hyperlinks positioned one below the other on the electronic display device 200 as illustrated in FIG. 12A. The user may invoke a specific document among the multiple documents of the frames by activating the hyperlinks displayed on the electronic display device 200.

Figure 12B:
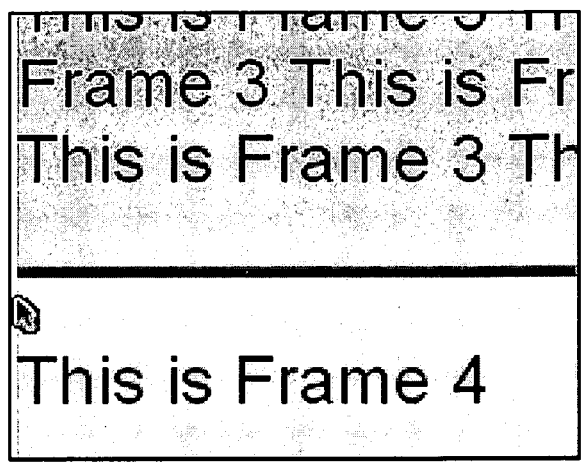

If the user selects the "As block" display option, the embedded browser application 201 applies an adaptive rendering rule for displaying the frame as a block element and ignores the tabular format of presenting the frame as illustrated in FIG. 12B. The "As block" display option may also be represented as an "Embedded" display option as illustrated in FIG. 11. Each of the frames may be displayed in a predefined order on the electronic display device 200.

Figure 12C:
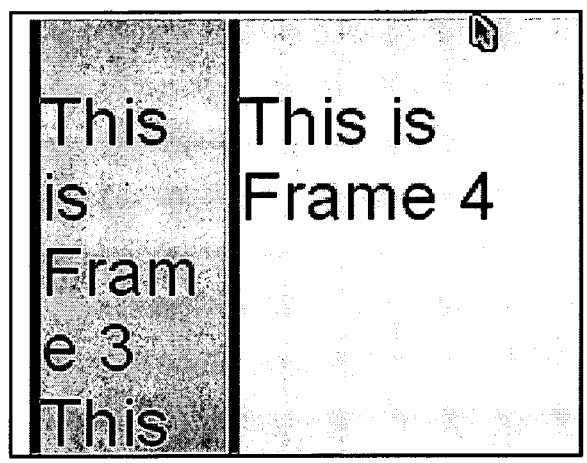

If the user selects the "Page Instruction" display option, illustrated in FIG. 11, the embedded browser application 201 applies an adaptive rendering rule to adaptively render the frame in accordance with the web page script of the web page without modifying the dimensions of the frame as illustrated in FIG. 12C. If the user selects the "Ignore" display option illustrated in FIG. 11, the embedded browser application 201 ignores the multiple documents in the frame and may not render the multiple documents in the frame on the electronic display device 200.

Figure 13:
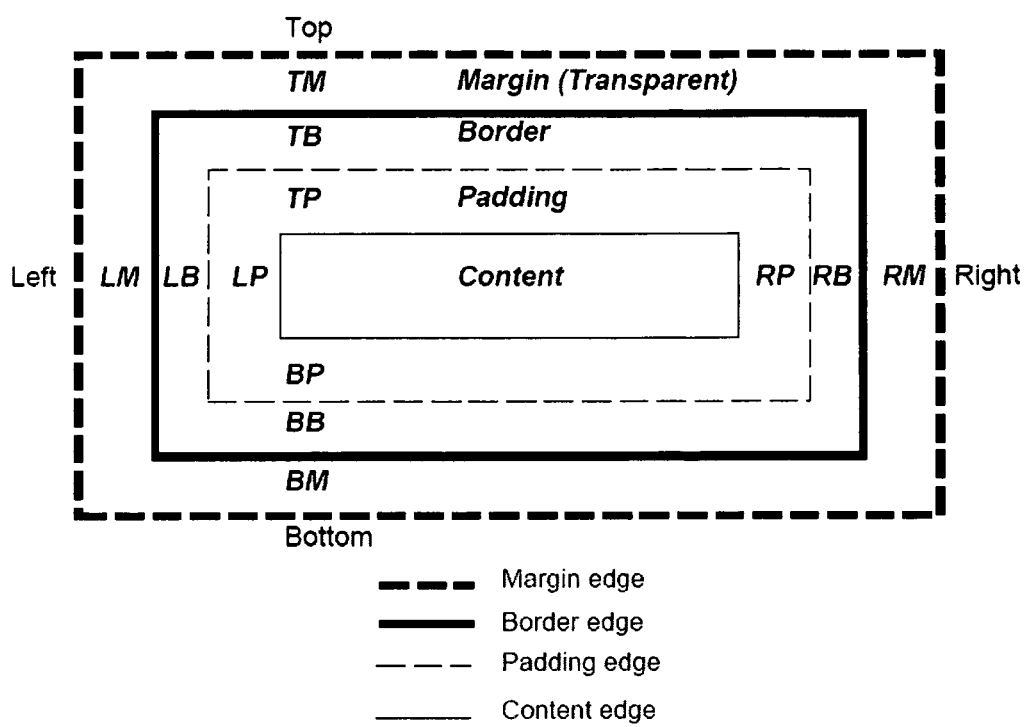
FIG. 13 exemplarily illustrates a cascading style sheet box model for presenting a web page.

The embedded browser application 201 may also identify alterable display attributes used in cascading style sheets (CSS) for controlling visual aspects of the elements on the web page. The CSS is a style sheet language used to describe the visual presentation of a web page and the elements of web page written in a markup language. The CSS is used to style web pages written in the markup language. For example, the embedded browser application 201 may render the web page based on the CSS box model. The CSS box model represents the web page elements presented in a bounded box on the electronic display device 200. The CSS box model contains web page element content at the core of the bounded box, an envelope of padding around the web page element content, a border around the padding demarcating the visible area of the web page element content, and a margin around the border as illustrated in FIG. 13.

The identified display attributes used in the CSS may, for example, comprise a margins property, a padding property, a background image property, and a text float property. The embedded browser application 201 may then present the display options corresponding to each of the identified display attributes used in the CSS to the user on the electronic display device 200. For example, the display options presented by the embedded browser application 201 for the margins property and the padding property of the web page may both comprise a "Page Instruction" display option, an "Aspect Ratio" display option, a "Scale on Exceed" display option, an "Ignore on exceed" display option, and an "Ignore" display option as illustrated in FIG. 14 and FIG. 16 respectively. The margins property and the padding property may affect spatial layout of the web page. Therefore, space available for displaying visual content on the web page may vary based on modifications to the spatial layout of the web page. If the user selects the "Page Instruction" display option, the embedded browser application 201 applies an adaptive rendering rule to adaptively render the visual content of the web page in accordance with the margin property and the padding property specified in the CSS of the web page without modifying the spatial layout of the web page as illustrated in FIG. 15A and FIG. 17A respectively.

If the user selects the "Aspect Ratio" display option, the embedded browser application 201 applies an adaptive rendering rule for resizing the spatial layout to conform to the display size of the electronic display device 200 by modifying the margins property and the padding property as illustrated in FIG. 15B and FIG. 17B respectively. The embedded browser application 201 may modify the size of margins and padding on the spatial layout based on the applied adaptive rendering rule. The size of the margins and the padding are defined by the margins property and the padding property in the CSS of the web page. For example, the embedded browser application 201 may modify the size of left margin, right margin, top margin, bottom margin, left padding, right padding, top padding, and bottom padding, of the spatial layout of the web page.

If the user selects the "Scale on Exceed" display option or the "Ignore on Exceed" display option, the embedded browser application 201 applies an adaptive rendering rule to scale the spatial layout of the web page by modifying the margins property and the padding property as illustrated in FIG. 15C and FIG. 17C respectively. If the visual content on the web page exceeds the modified spatial layout of the web page, the user may select the "Scale on Exceed" display option after selection of the "Aspect ratio" display option. The user may also select the "Scale on Exceed" display option to scale the spatial layout of the web page in accordance with the values of the margin property and the padding property specified in the CSS of the web page. If the user selects the "Ignore on Exceed" display option, the embedded browser application 201 may also apply an adaptive rendering rule to ignore the display of the visual content exceeding the spatial layout of the web page. The user may also select the "Ignore on Exceed" display option to ignore the size of the margins and the padding of the spatial layout and display the visual content of the web page as specified in the CSS of the web page. The user may select the "Ignore" display option to ignore the margins property and the paddy property specified in the CSS of the web page as illustrated in FIG. 15D and FIG. 17D respectively.

Figure 18:
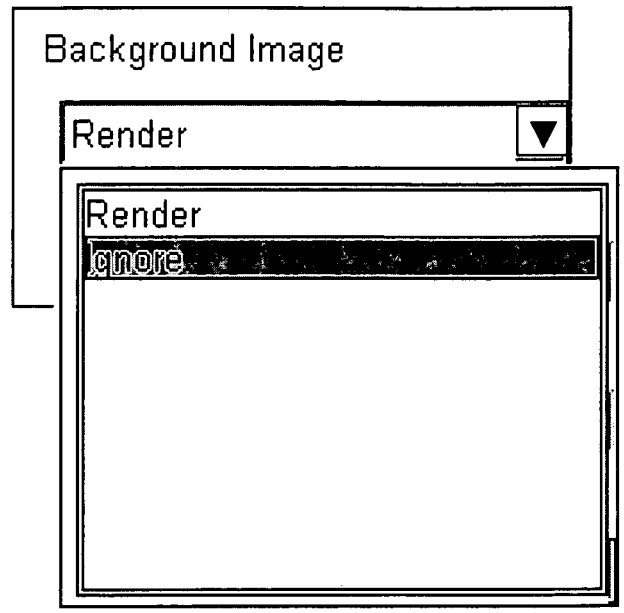
FIG. 18 exemplarily illustrates display options presented to a user for a background image property in a cascading style sheet box model of a web page.

The display options presented by the embedded browser application 201 for the background image property of a web page may, for example, comprise a "Render" display option and an "Ignore" display option as illustrated on FIG. 18. The background image property sets a visual image as background image on the web page on top of background color of the web page on the electronic display device 200. If the user selects the "Render" display option, the embedded browser application 201 renders the visual image linked to the background image property in the CSS of the web page. If the user selects the "Ignore" display option, the embedded browser application 201 ignores the visual image linked to the background image property in the CSS of the web page. The user may select the "Ignore" display option to view the web page without the background image on the electronic display device 200.

Figure 19:
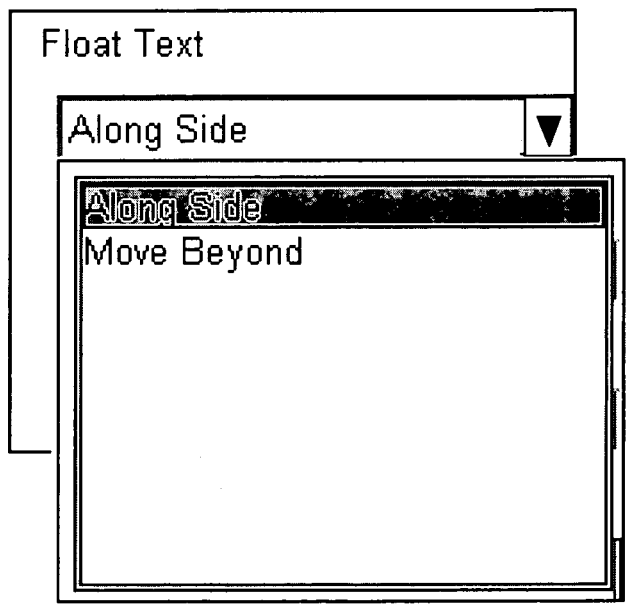
FIG. 19 exemplarily illustrates display options presented to a user for a text float property in a cascading style sheet box model of a web page.
Figure 20A:
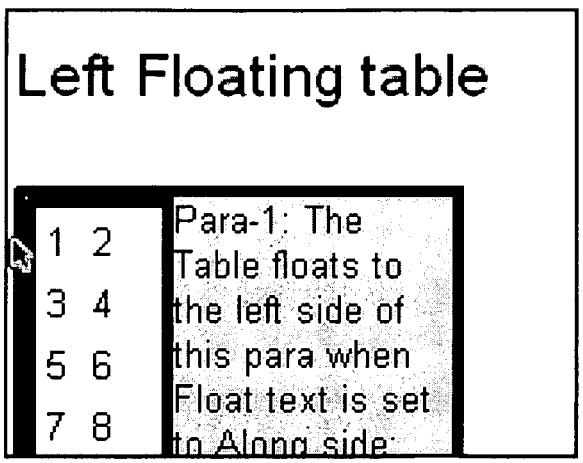
FIGS. 20A-20B exemplarily illustrate an adaptively rendered web page in dissimilar visual presentation formats based on modifications to the text float property in the cascading style sheet box model of the web page.
Figure 20B:
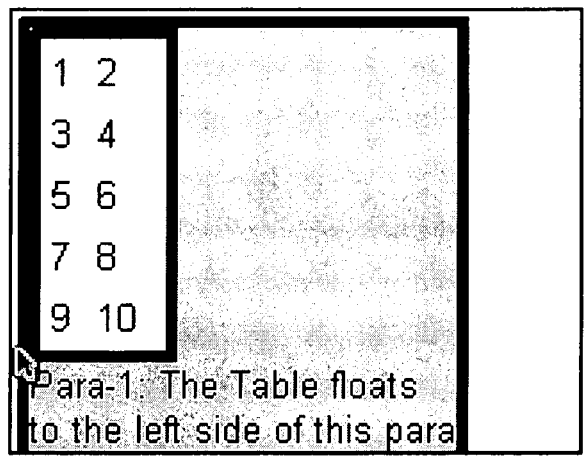

The display options presented by the embedded browser application 201 for the text float property of a web page may, for example, comprise an "Along Side" display option and a "Move Beyond" display option as illustrated in FIG. 19. The text float property controls positioning of text content of the web page adjacent to a content window of the web page on the electronic display device 200. The content window may be on the left side or the right side of the web page. If the user selects the "Along Side" display option, the embedded browser application 201 applies an adaptive rendering rule to position the text content of the web page on the right side of the content window if the content window is present on the left side of the web page as illustrated in FIG. 20A. The embedded browser application 201 may also apply an adaptive rendering rule to position the text content of the web page on left side of a content window if the content window is present on the right side of the web page. The user selects the "Move Beyond" display option to ignore the position of the text content adjacent to the content window and allow the text content to be positioned in accordance with the text float property in the CSS of the web page as illustrated in FIG. 20B.

Figure 21:
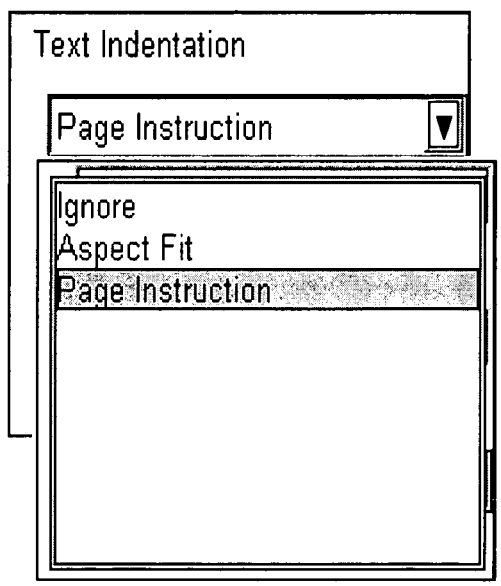
FIG. 21 exemplarily illustrates display options presented to a user for a text indentation property in a cascading style sheet box model of a web page.

Consider an example where one of the web page elements is text at the core of the bounded box in the CSS box model of the web page. The alterable display attributes of the text in the CSS box model of the web page may, for example, be text indentation, font size, and text lines of the text displayed on the web page. The display options presented for modifying the text indentation of the text in the CSS box model may, for example, comprise a "Page Instruction" display option, an "Aspect Fit" display option, and an "Ignore" display option as illustrated in FIG. 21. If the user selects the "Page Instruction" display option, the embedded browser application 201 applies an adaptive rendering rule to retain indented text on the web page as specified in the web page script of the web page as illustrated in FIG. 22A. If the user selects the "Aspect Fit" display option, the embedded browser application 201 applies an adaptive rendering rule to accommodate the indented text within the display size of the electronic display device 200 as illustrated in FIG. 22B. The embedded browser application 201 may modify the text indentation of the text to fit within the display size of the electronic display device 200 if the indented text on the web page exceeds the display size of the electronic display device 200 as illustrated in FIG. 22A. If the user selects the "Ignore" display option, the embedded browser application 201 applies an adaptive rendering rule to remove the indentation of the text on the web page as illustrated in FIG. 22C.

The display options presented for modifying the font size of the text may, for example, comprise a "Page Instruction" display option and an "Ignore" display option as illustrated in FIG. 23. If the user selects the "Page Instruction" display option, the embedded browser application 201 applies an adaptive rendering rule to retain the font size of the text on the web page as specified in the web page script of the web page as illustrated in FIG. 24A. If the user selects the "Ignore" display option, the embedded browser application 201 applies an adaptive rendering rule to modify the font size of the text to a predefined default font size in order to conform to the display size of the electronic display device 200 as illustrated in FIG. 24B.

Figure 25:
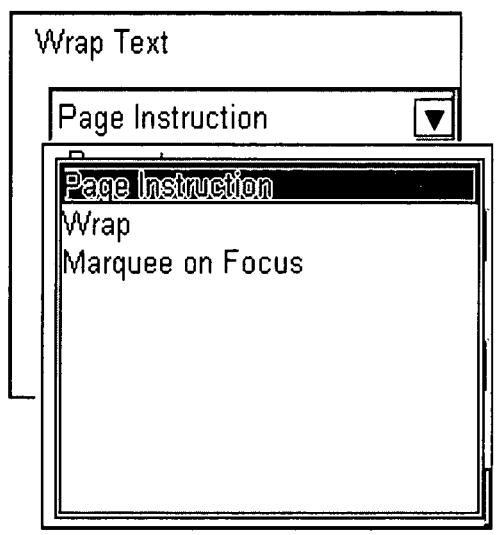
FIG. 25 exemplarily illustrates display options presented to a user for text wrap of text in a cascading style sheet box model of a web page.

The display options presented for modifying the text lines to facilitate text wrap may, for example, comprise a "Page Instruction" display option, a "Wrap" display option, and a "Marquee on Focus" display option as illustrated in FIG. 25. If the user selects the "Page Instruction" display option, the embedded browser application 201 applies an adaptive rendering rule to retain the text lines as specified in the web page script of the web page as illustrated in FIG. 26A. If the user selects the "Wrap" display option, the embedded browser application 201 applies an adaptive rendering rule to provide line breaks to the text lines of the text in order to display the text lines within the display size of the electronic display device 200 as illustrated in FIG. 26B. The embedded browser application 201 may provide the line breaks if the text lines exceed the display size of the electronic display device 200. If the user selects the "Marquee on Focus" display option, the embedded browser application 201 applies an adaptive rendering rule to enable partial text on the web page and to display the text in entirety when the user focuses a cursor on the partial text on the electronic display device 200 as illustrated in FIG. 26C. The embedded browser application 201 may cause the text in entirety to scroll up, down, left or right of the partial text on the web page.

Figure 27:
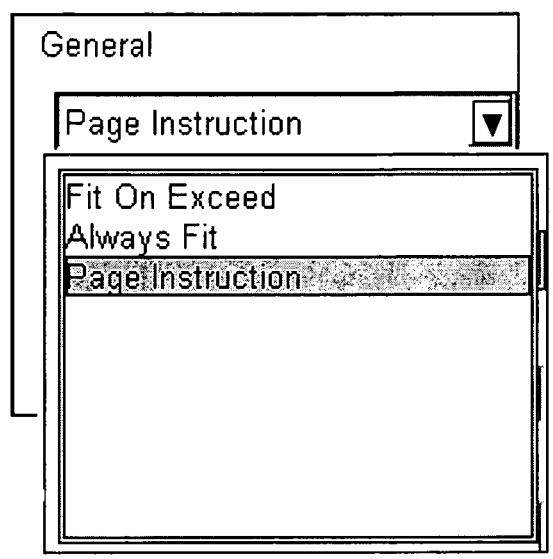
FIG. 27 exemplarily illustrates display options presented to a user for presenting multiple child web page elements relative to a parent web page element of a web page.
Figure 29:
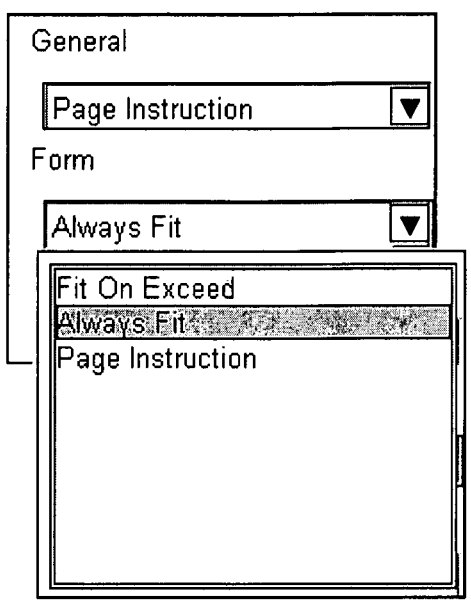
FIG. 29 exemplarily illustrates display options presented to a user for presenting data forms of a web page.

Consider an example where a parent web page element comprises multiple child web page elements. For example, consider an example of a data form as the parent web page element comprising multiple text boxes as the child web page elements. Display options presented to the user by the embedded browser application 201 to modify the display position of the child web page elements relative to the parent web page element on the electronic display device 200 may, for example, comprise a "Fit on Exceed" display option, an "Always Fit" display option, and a "Page instruction" display option as illustrated FIG. 27. The display options presented by the embedded browser application 201 for the data form may also, for example, comprise the "Fit on Exceed" display option, the "Always Fit" display option, and the "Page instruction" display option as illustrated FIG. 29.

Figure 30A:
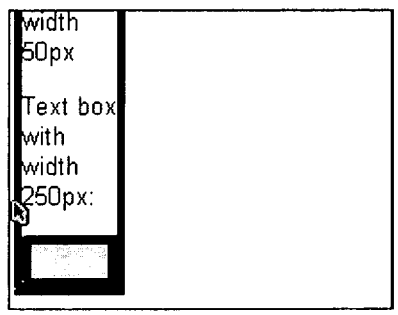
FIGS. 30A-30C exemplarily illustrate an adaptively rendered web page in dissimilar visual presentation formats based on modifications to display positions of the web page elements within the data forms of the web page.
Figure 30B:
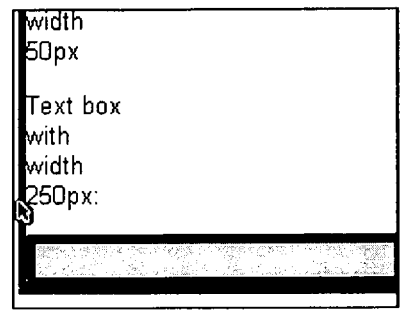
Figure 30C:
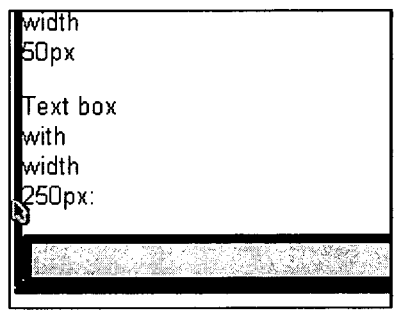

If the user selects the "Fit on Exceed" display option, the embedded browser application 201 may fit the web page elements within the display screen size of the electronic display device 200 when display of the web page elements exceeds the display screen size as illustrated in FIG. 28A and FIG. 30A. If the user selects the "Always Fit" display option, the embedded browser application 201 always fits the web page elements within the display screen size of the electronic display device 200 as illustrated in FIG. 28B and FIG. 30B. If the user selects the "Page Instruction" display option, the embedded browser application 201 may display the web page elements on the electronic display device 200 in accordance with the web page script of the web page without modifying the display position of the web page elements as illustrated in FIG. 28C and FIG. 30C.

FIG. 2 illustrates a system for adaptive rendering of a web page on an electronic display device 200 in a visual presentation format based on preferences of a user. The system disclosed herein comprises an electronic display device 200 on which an embedded browser application 201 is provided. The embedded browser application 201 comprises a graphical user interface 201a (GUI), an attribute identification module 201b, an attribute definition module 201c, an option presentation module 201d, a storage module 201e, an adaptive rule engine 201f, an attribute modification module 201g, a format creation module 201h, a rendering module 201i, and a capture module 201j.

The attribute identification module 201b identifies multiple alterable display attributes of multiple elements on the web page. The embedded browser application 201 may receive the web page from a server via network. The option presentation module 201d presents display options corresponding to each of the identified display attributes to the user on the GUI 201a. The attribute definition module 201c enables an expert to define multiple display attributes based on predetermined criteria, for example, the geographical location of the user, user demographics, market trends, type of the electronic display device 200, and technology used in the electronic display device 200. The option presentation module 201d presents multiple display options to the user corresponding to each of the defined display attributes.

The user selects one or more of the display options presented on the GUI 201a. The storage module 201e stores user information and the preferences of the user on the electronic display device 200. The user information may, for example, comprise the geographical location of the user, user interaction patterns on the embedded browser application 201, and user demographics. The stored preferences of the user may, for example, comprise the presented display options selected by the user over a period of time, the visual presentation format of the adaptively rendered web page, and the modifications made to the identified display attributes.

The adaptive rule engine 201f applies at least one of multiple adaptive rendering rules on the identified display attributes based on the selected display options. The attribute modification module 201g modifies the identified display attributes of the web page elements based on the applied adaptive rendering rules. The format creation module 201h creates a visual presentation format by incorporating the modified display attributes of the web page elements. The rendering module 201i then renders the web page adaptively on the electronic display device 200 in the created visual presentation format. The adaptively rendered web page is displayed on the GUI 201a. The adaptively rendered web page comprises the web page elements with the modified display attributes.

The rendering module 201i may adaptively render the web page in multiple different visual presentation formats based on user preferences. The format creation module 201h incorporates the modified display attributes of the web page elements of the adaptively rendered web page in each of the visual presentation formats. The rendering module 201*i* may also adaptively render multiple web pages electronic display device 200 in the created customized visual presentation layout format based on user preferences and the user information stored by the storage module 201*e*. The rendering module 201*i* may also adaptively render the web page on the electronic display device 200 based on predefined capabilities of the electronic display device 200. The predefined capabilities of the electronic display device 200 may, for example, comprise the display size of the electronic display device 200 and memory of the electronic display device 200.

The capture module 201*j* captures the display options repeatedly selected by the user over a period of time. The attribute modification module 201*g* then modifies the identified display attributes of the web page elements based on said captured display options. The format creation module 201*h* then creates the visual presentation format by incorporating the modified display attributes. The rendering module 201*i* then intelligently renders the web page in the visual presentation format. The capture module 201*j* also captures the visual presentation format of the adaptively rendered web page. The rendering module 201*i* then intelligently renders multiple web pages on the electronic display device 200 in the visual presentation format captured by the embedded browser application 201.

It will be readily apparent that the various methods and algorithms described herein may be implemented in a computer readable medium appropriately programmed for computers and physical computing devices. Typically a processor, for e.g., two or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A method of adaptive rendering of a web page on a display screen of an embedded device, comprising the steps of:

providing an embedded browser application on said embedded device;

receiving on said display screen of said embedded device a web page that has been configured for complete display on a monitor of a general purpose computer system, wherein a plurality of web page elements on said received web page is identified, by said embedded browser application;

identifying a plurality of alterable display attributes for each of said plurality of web page elements on said received web page by said embedded browser application, wherein said alterable display attributes control visual aspects of said web page elements;

presenting a plurality of display options to a user of said embedded device for each of said identified plurality of alterable display attributes of each of said plurality of web page elements of said web page, by said embedded browser application;

receiving a selection of display options from said user for each of said plurality of alterable display attributes of each of said plurality of web page elements of said web page, wherein said user selects said display options from said presented plurality of display options for each of said plurality of alterable display attributes of each of said plurality of web page elements of said web page;

selecting adaptive rendering rules for modifying each of said plurality of alterable display attributes of each of said plurality of web page elements of said web page based on said received display option from said user for each of said plurality of alterable display attributes of each of said plurality of web page elements of said web page, by said embedded browser application;

modifying each of the identified plurality of alterable display attributes of each of said plurality of web page elements of said web page corresponding to said received display option for each of said plurality of alterable display attributes of each of said plurality of web page elements of said web page, by the embedded browser application, by applying said selected adaptive rendering rules to each of said plurality of alterable display attributes of each of said plurality of web page elements of said web page, based on a size of the display screen of said embedded device, and a memory size of the embedded device;

creating a visual presentation format by the embedded browser application by incorporating said modified plurality of alterable display attributes for each of the web page elements of said web page; and rendering the web page adaptively on the display screen of said embedded device, by the embedded browser application,
  in said visual presentation format, without re-downloading the web page, by
  rendering each of said web page elements in a different view based on modification of said web page elements, wherein said modification of said web page elements is based on user selection of display options for each of said plurality of alterable display attributes of each of said web page elements of said web page, and wherein said adaptively rendered web page comprises the web page elements with the modified plurality of alterable display attributes.

2. The method of claim 1, wherein said display options represent preferences of the user.

3. The method of claim 1, wherein the embedded browser application captures the visual presentation format of the adaptively rendered web page for rendering a plurality of web pages on the display screen of said embedded device in the visual presentation format captured by the embedded browser application.

4. The method of claim 2, wherein the embedded browser application captures said display options selected by the user for rendering the web page on the display screen of said embedded device in the visual presentation format, wherein the visual presentation format is created by modifying the identified display attributes of the web page elements based on said captured display options.

5. The method of claim 2, wherein the web page is adaptively rendered on the display screen of said embedded device in a plurality of visual presentation formats based on the preferences of the user.

6. The method of claim 2, further comprising the step of storing user information and the preferences of the user on the embedded device, wherein said user information comprises geographical location of the user, user interaction patterns on the embedded browser application, and user demographics, and wherein said stored preferences of the user comprise the presented display options selected by the user, the visual presentation format of the adaptively rendered web page, and said modifications to the identified display attributes.

7. The method of claim 6, wherein a plurality of web pages are intelligently rendered on the display screen of said embedded device in the created visual presentation format based on said stored user information and said stored preferences of the user.

8. The method of claim 1, wherein said steps of identifying the alterable display attributes and presenting said display options are performed on a remote computing device based on the attributes of the embedded device, and wherein the embedded browser application creates the visual presentation format by modifying the alterable display attributes obtained from said remote computing device based on the selection of display options by the user, and renders the web page adaptively on the display screen of said embedded device.

9. The method of claim 2, further comprising the step of defining a plurality of display attributes by the user based on predetermined criteria, wherein said predetermined criteria are geographical location of the user, user demographics, market trends, type of the embedded device, and technology used in the embedded device.

10. The method of claim 9, further comprising the step of presenting a plurality of display options to the user corresponding to each of said defined display attributes.

11. The method of claim 1, wherein the embedded browser application starts applying the adaptive rendering rules as and when each web page is received.

12. The method of claim 1, wherein in the embedded browser application provides the user of the embedded device interactivity based on said size of the display screen of said embedded device, and said memory size of the embedded device.

13. A system for adaptive rendering of a web page on a display screen of an embedded device, comprising:
  an embedded system comprising a processor for implementing an embedded browser application on said embedded device;
  said embedded system receiving on its display screen the web page requested by the user, wherein the received web page has been configured for complete display on a monitor of a computer system, and wherein said embedded browser application identifies a plurality of web page elements on said received web page;
  a graphical user interface for displaying said web page comprising said plurality of web page elements on the display screen of said embedded device;
  an attribute identification module for identifying a plurality of alterable display attributes of each of said plurality of web page elements of said web page, wherein said alterable display attributes control visual aspects of said web page elements;
  said graphical user interface for presenting a plurality of display options to a user of said embedded device for each of said identified plurality of alterable display attributes of each of said plurality of web page elements of said web page;
  said graphical user interface for receiving a selection of display options from said user for each of said plurality of alterable display attributes of each of said web page elements of said web page, wherein said user selects display options from said presented plurality of display options for each of said plurality of alterable display attributes of each of said web page elements of said web page;
  an adaptive rule engine for selecting and applying adaptive rendering rules to each of said identified plurality of alterable display attributes of each of said web page elements of said web page, based on said received display options from said user for each of said plurality of alterable display attributes of each of said web page elements of said web page;

an attribute modification module for modifying the identified plurality of alterable display attributes of each of the web page elements based on said applied adaptive rendering rules and corresponding to said received display option for each of said plurality of alterable display attributes of each of said plurality of web page elements of said web page, wherein said attribute modification module modifies said identified plurality of alterable display attributes of each of said plurality of web page elements of said web page based on predefined capabilities of the embedded device comprising a size of the display screen of said embedded device and a memory size of the embedded device;

a format creation module for creating a visual presentation format by incorporating said modified plurality of alterable display attributes for each of the web page elements of said web page; and a rendering module for rendering the web page adaptively on the display screen of said embedded device in said created visual presentation format, wherein said rendering module adaptively renders the web page on the display screen of said embedded device in said visual presentation format without re-downloading the web page, by rendering each of said web page elements in a different view based on modification of said web page elements, wherein said modification of said web page elements is based on user selection of display options for each of said plurality of alterable display attributes of each of said web page elements of said web page, and wherein said adaptively rendered web page comprises the web page elements with the modified plurality of alterable display attributes.

14. The system of claim 13, further comprises an option presentation module for presenting a plurality of display options corresponding to each of said identified display attributes to said user on said graphical user interface, wherein the user selects one or more of said presented display options on the graphical user interface, and wherein said rendering module adaptively renders the web page on the display screen of said embedded device in a plurality of visual presentation formats based on said preferences of the user.

15. The system of claim 13, wherein said embedded browser application further comprises a storage module for storing user information and said preferences of the user on the embedded device, wherein said user information comprises geographical location of the user, user interaction patterns on the embedded browser application, and user demographics, and wherein said stored preferences of the user comprise the presented display options selected by the user over a period of time, the visual presentation format of the adaptively rendered web page, and said modifications to the identified display attributes.

16. The system of claim 15, wherein the rendering module intelligently renders a plurality of web pages on the display screen of said embedded device in the created visual presentation format based on said stored user information and said stored preferences of the user.

17. The system of claim 13, wherein said embedded browser application further comprises an attribute definition module for enabling the user to define a plurality of display attributes based on predetermined criteria, wherein said predetermined criteria are geographical location of the user, user demographics, market trends, type of the embedded device, and technology used in the embedded device.

18. The system of claim 17, wherein the option presentation module presents a plurality of display options to the user corresponding to each of said defined display attributes.

19. A computer program product comprising computer executable instructions embodied in a non-transitory computer-readable medium, wherein said computer program product comprises:

a first computer parsable program code for receiving on a display screen of an embedded device a web page requested by a user, identifying a plurality of web page elements on said received web page, and identifying a plurality of alterable display attributes of each of said plurality of web page elements on said received web page, wherein the received web page has been configured for complete display on a monitor of a computer system;

a second computer parsable program code for presenting a plurality of display options to a user of said embedded device for each of said identified plurality of alterable display attributes of each of said web page elements of said web page, and receiving a selection of display options from said user, wherein said user selects display options from said presented plurality of display options for each of said plurality of alterable display attributes of each of said web page elements of said web page;

a third computer parsable program code for selecting and applying adaptive rendering rules based on said received display options from said user for each of said plurality of alterable display attributes of each of said web page elements of said web page, and modifying the identified plurality of alterable display attributes of each of said web page elements of said web page corresponding to said received display options for each of said plurality of alterable display attributes of each of said plurality of web page elements of said web page, based on a size of the display screen of said embedded device, and a memory size of the embedded device;

a fourth computer parsable program code for creating a visual presentation format by incorporating said modified plurality of alterable display attributes for each of the web page elements of said web page; and a fifth computer parsable program code for rendering said web page adaptively on said display screen of said embedded device,
in said visual presentation format, without re-downloading the web page, by
rendering each of said web page elements in a different view based on modification of said web page elements, wherein said modification of said web page elements is based on user selection of display options for each of said plurality of alterable display attributes of each of said web page elements of said web page, and wherein said adaptively rendered web page comprises the web page elements with the modified plurality of alterable display attributes.

* * * * *